(12) United States Patent
Palys et al.

(10) Patent No.: US 10,344,142 B2
(45) Date of Patent: Jul. 9, 2019

(54) LIQUID AND MELTABLE SOLID GRADES OF SCORCH PROTECTED PEROXIDES

(71) Applicant: Arkema Inc., King of Prussia, PA (US)

(72) Inventors: Leonard H. Palys, Downingtown, PA (US); William P. Pavlek, Stevens, PA (US); Peter R. Dluzneski, Harleysville, PA (US)

(73) Assignee: ARKEMA INC., King of Prussia, PA (US)

( * ) Notice: Subject to any disclaimer, the term of this patent is extended or adjusted under 35 U.S.C. 154(b) by 0 days.

(21) Appl. No.: 15/531,740

(22) PCT Filed: Dec. 4, 2015

(86) PCT No.: PCT/US2015/063854
§ 371 (c)(1),
(2) Date: May 31, 2017

(87) PCT Pub. No.: WO2016/094200
PCT Pub. Date: Jun. 16, 2016

(65) Prior Publication Data
US 2017/0267834 A1 Sep. 21, 2017

Related U.S. Application Data

(60) Provisional application No. 62/089,384, filed on Dec. 9, 2014.

(51) Int. Cl.
| | |
|---|---|
| *C08K 5/3435* | (2006.01) |
| *C08K 5/08* | (2006.01) |
| *C08K 5/14* | (2006.01) |
| *C08K 5/32* | (2006.01) |
| *C08F 110/02* | (2006.01) |
| *C08F 118/08* | (2006.01) |
| *C08J 3/24* | (2006.01) |

(52) U.S. Cl.
CPC .......... *C08K 5/3435* (2013.01); *C08F 110/02* (2013.01); *C08F 118/08* (2013.01); *C08J 3/242* (2013.01); *C08K 5/08* (2013.01); *C08K 5/14* (2013.01); *C08K 5/32* (2013.01); *C08F 2810/20* (2013.01); *C08J 2323/06* (2013.01); *C08J 2331/04* (2013.01)

(58) Field of Classification Search
CPC .......... C08K 5/3435; C08K 5/14; C08K 5/08; C08F 110/02; C08F 118/08; C08F 2810/20; C08J 3/242; C08J 2323/06; C08J 2331/04
USPC ........................................................ 524/99
See application file for complete search history.

(56) References Cited

U.S. PATENT DOCUMENTS

| | | | |
|---|---|---|---|
| 5,245,084 A | 9/1993 | Groepper et al. | |
| 6,197,213 B1 | 3/2001 | Novits et al. | |
| 6,197,231 B1 | 3/2001 | Lisec | |
| 6,767,940 B2 * | 7/2004 | Voorheis | A63B 37/0003 473/354 |
| 8,618,194 B2 * | 12/2013 | Pfeil | C04B 26/04 156/295 |
| 9,068,045 B2 * | 6/2015 | Nava | C08L 67/06 |
| 2002/0177671 A1 | 11/2002 | Palys et al. | |
| 2003/0097017 A1 | 5/2003 | Sutoris et al. | |
| 2009/0069469 A1 | 3/2009 | Esseghir et al. | |

* cited by examiner

*Primary Examiner* — Hui H Chin
(74) *Attorney, Agent, or Firm* — Lynn B. Morreale

(57) ABSTRACT

Embodiments of organic peroxide formulations provide longer scorch time protection and require fewer additives. The peroxide formulations may include, for example, at least one organic peroxide, at least one nitroxide-containing compound (e.g., 4-hydroxy-TEMPO), and at least one quinone-containing compound (e.g., mono-tert-butylhydroquinone). Embodiments of the present invention relate to organic peroxide compositions comprising scorch retarders. Embodiments of the invention also relate to crosslinkable elastomer compositions, processes for curing the elastomers, and products made by such processes.

17 Claims, No Drawings

LIQUID AND MELTABLE SOLID GRADES OF SCORCH PROTECTED PEROXIDES

CROSS-REFERENCE TO RELATED APPLICATIONS

This application is a national stage application under 35 U.S.C. § 371 of PCT/US2015/063854 filed Dec. 4, 2015, which claims benefit to U.S. patent application Ser. No. 62/089,384, filed Dec. 9, 2014.

FIELD OF THE INVENTION

The present invention relates to compositions and methods for creating liquid or meltable solid peroxide formulations with increased scorch protection, and products made by those methods.

BACKGROUND OF THE INVENTION

Organic peroxides are commonly used to crosslink thermoplastic polymers and elastomers, and their mixtures, when the final products are required to meet high mechanical and physical requirements, such as improved thermal aging and lower residual (permanent) deformation under pressure compared with uncrosslinked thermoplastics and/or sulfur cured elastomers. Since both thermoplastics and elastomers are solid materials at room temperatures, in order to add the free radical crosslinking agent and any other desired ingredients such as dyes, pigments, fillers, antioxidants, UV and heat stabilizers and the like into the polymer, the polymers must be mechanically mixed with the free radical crosslinking agent and any of the other desired ingredients at temperatures sufficiently elevated to allow the polymers to flow in the mixing equipment.

The crosslinking period and the time from the addition of the free radical precursor up to incipient cross linkage (scorch time) are dependent on the thermal decomposition rate (conveniently expressed as the half-life period) of the free radical initiators employed as crosslinking agents. The longer the processing time before onset of scorch that can be provided to a manufacturer without sacrifice of final crosslink speed or density, the more beneficial it will be because with conventional methods of mixing or compounding, such as milling, Banbury, or extrusion, scorch begins when the time and temperature relationship results in the start of appreciable decomposition of the free radical initiator. If this occurs too soon, gel particles in the mass of polymer to be compounded may be formed thereby producing non-homogeneity in the final product. Excessive scorch reduces the plastic properties of the material so that it can no longer be processed, thus, resulting in loss of the entire batch.

There have been several attempts to extend scorch time. U.S. Pat. No. 5,245,084 discloses the use of organic peroxides suitable for crosslinking thermoplastics and elastomers in combination with a specific group of hydroquinones and a crosslinkage promoter selected from crosslinkage promoters normally used in these applications. U.S. Pat. No. 6,197,231 teaches the use of a combination of free radical initiators (either organic peroxides or a specific class of azo initiators) in combination with hydroquinones, crosslinkage promoters and known sulfur releasing sulfur accelerators for extending scorch time without adverse effects on cure time or cure density for thermoplastics, elastomers and their mixtures.

There are several commercial grades of extended organic peroxide formulations on fillers. However, due to the poor solubility of solid additives in organic peroxides, it has not been possible to create a liquid peroxide formulation or homogeneous meltable solid that provides sufficient scorch protection and contains either no filler or lower amounts of filler. It would be desirable to have organic peroxide formulations with longer scorch times and lower loadings of additives.

SUMMARY OF THE INVENTION

Embodiments of the present invention relate to organic peroxide compositions comprising scorch retarders. Embodiments of the invention also relate to crosslinkable elastomer compositions, processes for curing the elastomers, and products made by such processes The scorch retarders 4-hydroxy-TEMPO (4-OHT; 4-hydroxy-2,2,6,6-tetramethylpiperidin-1-oxyl) and mono-tert-butylhydroquinone (MTBHQ) have very limited solubility in organic peroxides. However, the applicants unexpectedly found that a blend of the two retarders (4-OHT and MTBHQ) provides longer scorch time with less total additive needed in the organic peroxide formulation. This unexpected synergy, when using blends of these two classes of compounds, allows for easier dissolution of the additive package into the peroxide because significantly less is required.

In accordance with embodiments of the present invention, homogeneous liquid and meltable solid peroxide formulations can be created without the need for filler, or with very little filler. Furthermore, it is possible to melt the peroxide formulations or spray the liquid formulations onto fillers, if such a form is desired.

Non-limiting examples of applications for the peroxide formulations of the present invention include the use of liquid and filler-extended grades of the organic peroxides for crosslinked HDPE rotational molding; PEX-a pipe production; injection molded, compression molded, transfer molded crosslinked goods; wire and cable; general crosslinked elastomers, rubber and polymers; modification of polymer molecular weight and grafting of agents such as maleic anhydride (MAH) and glycidyl methacrylate; dynamic vulcanization for production of TPV (thermoplastic vulcanizates); and crosslinked rubber or polymer foams.

Embodiments of the present invention relate to an organic peroxide formulation comprising, consisting essentially of, or consisting of at least one organic peroxide, at least one nitroxide-containing compound (e.g., 4-OHT), and at least one quinone-containing compound (e.g., MTBHQ). The formulation provides longer scorch time protection and less total additive in comparison to prior art formulations.

Embodiments of the present invention also relate to an elastomer composition comprising, consisting essentially of, or consisting of at least one elastomer, at least one organic peroxide, at least one nitroxide-containing compound (e.g., 4-OHT), and at least one quinone-containing compound (e.g., MTBHQ).

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide, at least one nitroxide-containing compound (e.g., 4-OHT), and at least one quinone-containing compound (e.g., MTBHQ). Embodiments of the present invention also relate to products made by this process.

DETAILED DESCRIPTION

The applicants have discovered that a blend of at least one nitroxide-containing compound (e.g., 4-OHT) and at least one quinone-containing compound (e.g., MTBHQ) provides organic peroxide formulations with longer scorch times, wherein less total additive is needed in the formulation. This unexpected synergy, when using blends of these two classes of compounds, allows for easier dissolution of the additive package into the peroxide because significantly less is required.

One aspect of the present invention relates to an organic peroxide formulation comprising, consisting essentially of, or consisting of at least one organic peroxide, at least one nitroxide-containing compound (e.g., 4-hydroxy-TEMPO (4-OHT)), and at least one quinone-containing compound (e.g., mono-tert-butylhydroquinone (MTBHQ)). The formulation provides longer scorch time protection and less total additive in comparison to prior art formulations All those organic peroxides known to undergo decomposition by heat to generate radicals capable of initiating the desired curing (crosslinking) reactions are contemplated as suitable for use in the formulations of the present invention. Non-limiting examples include dialkyl peroxides, diperoxyketals, mono-peroxy carbonates, cyclic ketone peroxides, diacyl peroxides, organosulfonyl peroxides, peroxyesters and solid, room temperature stable peroxydicarbonates. In at least one embodiment, the organic peroxide is selected from dialkyl peroxides, peroxyketals, cyclic ketone peroxides, monoperoxycarbonates, peroxyesters and diacyl peroxides.

Peroxide names and physical properties for all these classes of organic peroxides can be found in "Organic Peroxides" by Jose Sanchez and Terry N. Myers; Kirk-Othmer Encyclopedia of Chemical Technology, Fourth Ed., Volume 18, (1996), the disclosure of which is incorporated herein by reference.

Illustrative dialkyl peroxide initiators include:
di-t-butyl peroxide;
t-butyl cumyl peroxide;
2,5-di(cumylperoxy)-2,5-dimethyl hexane;
2,5-di(cumylperoxy)-2,5-dimethyl hexyne-3;
4-methyl-4-(t-butylperoxy)-2-pentanol;
4-methyl-4-(t-amylperoxy)-2-pentanol;
4-methyl-4-(cumylperoxy)-2-pentanol;
4-methyl-4-(t-butylperoxy)-2-pentanone;
4-methyl-4-(t-amylperoxy)-2-pentanone;
4-methyl-4-(cumylperoxy)-2-pentanone;
2,5-dimethyl-2,5-di(t-butylperoxy)hexane;
2,5-dimethyl-2,5-di(t-amylperoxy)hexane;
2,5-dimethyl-2,5-di(t-butylperoxy)hexyne-3;
2,5-dimethyl-2,5-di(t-amylperoxy)hexyne-3;
2,5-dimethyl-2-t-butylperoxy-5-hydroperoxyhexane;
2,5-dimethyl-2-cumylperoxy-5-hydroperoxy hexane;
2,5-dimethyl-2-t-amylperoxy-5-hydroperoxyhexane;
m/p-alpha, alpha-di[(t-butylperoxy)isopropyl]benzene;
1,3,5-tris(t-butylperoxyisopropyl)benzene;
1,3,5-tris(t-amylperoxyisopropyl)benzene;
1,3,5-tris(cumylperoxyisopropyl)benzene;
di[1,3-dimethyl-3-(t-butylperoxy)butyl]carbonate;
di[1,3-dimethyl-3-(t-amylperoxy)butyl]carbonate;
di[1,3-dimethyl-3-(cumylperoxy)butyl]carbonate;
di-t-amyl peroxide;
dicumyl peroxide;
t-butylperoxy-meta-isopropenyl-cumyl peroxide;
t-amyl cumyl peroxide;
t-butyl-isopropenylcumylperoxide;
2,4,6-tri(butylperoxy)-s-triazine;
1,3,5-tri[1-(t-butylperoxy)-1-methylethyl]benzene
1,3,5-tri-[(t-butylperoxy)-isopropyl]benzene;
1,3-dimethyl-3-(t-butylperoxy)butanol;
1,3-dimethyl-3-(t-amylperoxy)butanol; and mixtures thereof.

Other dialkylperoxides which may be used singly or in combination with the other free radical initiators contemplated by the present disclosure are those selected from the group represented by the formula:

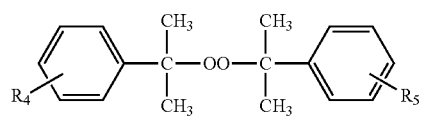

wherein $R_4$ and $R_5$ may independently be in the meta or para positions and are the same or different and are selected from hydrogen or straight or branched chain alkyls of 1 to 6 carbon atoms. Dicumyl peroxide and isopropylcumyl cumyl peroxide are illustrative.

Other dialkyl peroxides include:
3-cumylperoxy-1,3-dimethylbutyl methacrylate;
3-t-butylperoxy-1,3-dimethylbutyl methacrylate;
3-t-amylperoxy-1,3-dimethylbutyl methacrylate;
tri(1,3-dimethyl-3-t-butylperoxy butyloxy)vinyl silane;
1,3-dimethyl-3-(t-butylperoxy)butyl N-[1-{3-(1-methylethenyl)-phenyl}1-methylethyl]carbamate;
1,3-dimethyl-3-(t-amylperoxy)butyl N-[1-{3 (1-methylethenyl)-phenyl}-1-methylethyl]carbamate;
1,3-dimethyl-3-(cumylperoxy))butyl N-[1-{3-(1-methylethenyl)-phenyl}-1-methylethyl]carbamate.

In the group of diperoxyketal initiators, the preferred initiators include:
1,1-di(t-butylperoxy)-3,3,5-trimethylcyclohexane;
1,1-di(t-butylperoxy)cyclohexane;
n-butyl 4,4-di(t-amylperoxy)valerate;
ethyl 3,3-di(t-butylperoxy)butyrate;
2,2-di(t-amylperoxy)propane;
3,6,6,9,9-pentamethyl-3-ethoxycabonylmethyl-1,2,4,5-tetraoxacyclononane;
n-butyl-4,4-bis(t-butylperoxy)valerate;
ethyl-3,3-di(t-amylperoxy)butyrate; and mixtures thereof.

Illustrative solid, room temperature stable peroxydicarbonates include, but are not limited to: di(2-phenoxyethyl) peroxydicarbonate; di(4-t-butyl-cyclohexyl)peroxydicarbonate; dimyristyl peroxydicarbonate; dibenzyl peroxydicarbonate; and di(isobornyl)peroxydicarbonate. Other peroxides that may be used according to at least one embodiment of the present disclosure include benzoyl peroxide, OO-t-butyl-O-hydrogen-monoperoxy-succinate and OO-t-amyl-O-hydrogen-monoperoxy-succinate.

Illustrative cyclic ketone peroxides are compounds having the general formulae (I), (II) and/or (III).

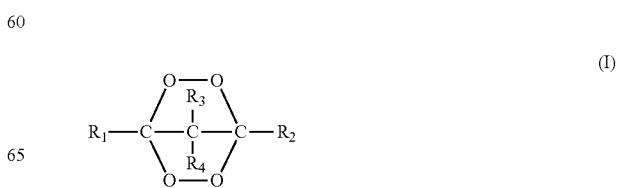

(I)

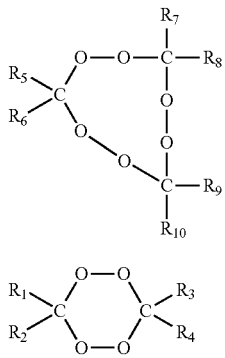

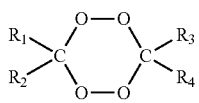

wherein $R_1$ to $R_{10}$ are independently selected from the group consisting of hydrogen, C1 to C20 alkyl, C3 to C20 cycloalkyl, C6 to C20 aryl, C7 to C20 aralkyl and C7 to C20 alkaryl, which groups may include linear or branched alkyl properties and each of $R_1$ to $R_{10}$ may be substituted with one or more groups selected from hydroxy, C1 to C20 alkoxy, linear or branched C1 to C20 alkyl, C6 to C20 aryloxy, halogen, ester, carboxy, nitride and amido, such as, for example, at least 20% of the total active oxygen content of the peroxide mixture used for a crosslinking reaction will be from compounds having formulas (I), (II) and/or (III).

Some examples of suitable cyclic ketone peroxides include:
3,6,9, triethyl-3,6,9-trimethyl-1,4,7-triperoxynonane (or methyl ethyl ketone peroxide cyclic trimer), methyl ethyl ketone peroxide cyclic dimer, and 3,3,6,6,9,9-hexamethyl-1,2,4,5-tetraoxacyclononane.

Illustrative examples of peroxy esters include:
2,5-dimethyl-2,5-di(benzoylperoxy)hexane;
t-butylperbenzoate;
t-butylperoxy acetate;
t-butylperoxy-2-ethyl hexanoate;
t-amyl perbenzoate;
t-amyl peroxy acetate;
t-butyl peroxy isobutyrate;
3-hydroxy-1,1-dimethyl t-butyl peroxy-2-ethyl hexanoate;
OO-t-amyl-O-hydrogen-monoperoxy succinate;
OO-t-butyl-O-hydrogen-monoperoxy succinate;
di-t-butyl diperoxyphthalate;
t-butylperoxy (3,3,5-trimethylhexanoate);
1,4-bis(t-butylperoxycarbo)cyclohexane;
t-butylperoxy-3,5,5-trimethylhexanoate;
t-butyl-peroxy-(cis-3-carboxy)propionate;
allyl 3-methyl-3-t-butylperoxy butyrate.

Illustrative monoperoxy carbonates include:
OO-t-butyl-O-isopropylmonoperoxy carbonate;
OO-t-butyl-O-(2-ethyl hexyl)monoperoxy carbonate;
1,1,1-tris[2-(t-butylperoxy-carbonyloxy)ethoxymethyl]propane;
1,1,1-tris[2-(t-amylperoxy-carbonyloxy)ethoxymethyl]propane;
1,1,1-tris[2-(cumylperoxy-cabonyloxy)ethoxymethyl]propane;
OO-t-amyl-O-isopropylmonoperoxy carbonate.

Illustrative diacyl peroxides include:
di(4-methylbenzoyl)peroxide;
di(3-methylbenzoyl)peroxide;
di(2-methylbenzoyl)peroxide;
didecanoyl peroxide; dilauroyl peroxide;
2,4-dibromo-benzoyl peroxide;
succinic acid peroxide.
dibenzoyl peroxide;
di(2,4-dichloro-benzoyl)peroxide.

Imido peroxides of the type described in PCT Application publication WO9703961 A1 6 Feb. 1997 are also contemplated as suitable for use and incorporated by reference herein.

Preferred peroxides include one or more of the following: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl) monoperoxy carbonate; 004-butyl-O-isopropylmonoperoxy carbonate; polyether poly-t-butylperoxy carbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate.

More preferred peroxides include one or more of the following: 2,5-di(t-butylperoxy)-2,5-dimethyl hexane; t-butyl cumyl peroxide; 2,5-dimethyl-2,5-di(t-butylperoxy) hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy) diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; dibenzoyl peroxide; di(2,4-dichlorobenzoyl)peroxide; cumene hydroperoxide; and di(4-tert-butylcyclohexyl) peroxydicarbonate.

Even more preferred peroxides include one or more of the following: 2,5-di(t-butylperoxy)-2,5-dimethyl hexane; t-butyl cumyl peroxide; 2,5-dimethyl-2,5-di(t-butylperoxy) hexyne-3; t-butylperoxy-isopropenylcumylperoxide; 3,3,5,7,7-pentamethyl,-1,2,4-trioxepane; m/p-di(t-butylperoxy) diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; 004-butyl-O-isopropylmonoperoxy carbonate; cumene hydroperoxide; t-butylperoxybenzoate; dibenzoyl peroxide; and di(2,4-dichlorobenzoyl)peroxide.

Most preferred peroxides include one or more of the following: 2,5-di(t-butylperoxy)-2,5-dimethyl hexane; t-butyl cumyl peroxide; 2,5-dimethyl-2,5-di(t-butylperoxy) hexyne-3; t-butylperoxy-isopropenylcumylperoxide; m/p-di (t-butylperoxy)diisopropyl benzene; m-di(t-butylperoxy) diisopropyl benzene; p-di(t-butylperoxy)diisopropyl benzene; dicumyl peroxide; cumene hydroperoxide; 1,1-di (t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2- ethyl hexyl)monoperoxy carbonate; OO-t-butyl-O-isopropylmonoperoxy carbonate; and t-butylperoxybenzoate.

Examples of the nitroxide (or "nitroxide-containing compound") may include derivatives of TEMPO (2,2,6,6-tetramethylpiperidine-1-oxyl), such as 4-hydroxy TEMPO (4-OHT) and 4-acetamido TEMPO. As used herein, the terms "quinone" or "quinone-containing compound" include both quinones and hydroquinones, as well as ethers thereof such as monoalkyl, monoaryl, monoaralkyl and bis(hydroxyalkyl) ethers of hydroquinones. Non-limiting examples of quinones that may be used in formulations of the present invention include mono-tert-butylhydroquinone (MTBHQ), hydroquinone, hydroquinone mono-methyl ether (HQMME) (also known as 4-methoxy phenol, mono-t-amylhydroquinone, hydroquinone bis(2-hydroxyethyl) ether, 4-ethoxy phenol, 4-phenoxy phenol, 4-(benzyloxy) phenol, 2,5-bis (morpholinomethyl) hydroquinone, and benzoquinone.

Preferred nitroxide-containing compounds include 4-hydroxy TEMPO (4-OHT) and TEMPO (2,2,6,6-tetramethylpiperidine 1-oxyl). Preferred quinone-containing compounds include mono-tert-butylhydroquinone (MTBHQ); hydroquinone; hydroquinone mono-methyl ether (HQMME) which is also known as 4-methoxy phenol (MEHQ); mono-t-amylhydroquinone and di-t-amyl hydroquinone.

In accordance with particular embodiments, organic peroxide formulations of the present invention may further include at least one crosslinking coagent and/or at least one filler. According to particular embodiments, examples of crosslinking coagents include allyl methacrylate, triallyl cyanurate, triallyl isocyanurate, trimethyloylpropane trimethacrylate (SR-350®), trimethyloylpropane triacrylate (SR-351®), zinc diacrylate, and zinc dimethacrylate.

Additional non-limiting examples of crosslinking coagents include: Sartomer-manufactured methacrylate-type coagents, such as:
SR205H Triethylene glycol dimethacrylate (TiEGDMA),
SR206H Ethylene glycol dimethacrylate (EGDMA),
SR209 Tetraethylene glycol dimethacrylate (TTEGDMA),
SR210HH Polyethylene glycol (200) dimethacrylate (PEG200DMA),
SR214 1,4-butanediol dimethacrylate (BDDMA),
SR231 Diethylene glycol dimethacrylate (DEGDMA),
SR239A 1,6-hexanediol dimethacrylate (HDDMA),
SR252 Polyethylene glycol (600) dimethacrylate (PEG600DMA),
SR262 1,12-dodecanediol dimethacrylate (DDDDMA),
SR297J 1,3-butylene glycol dimethacrylate (BGDMA),
SR348C Ethoxylated 3 bisphenol A dimethacrylate (BPA3EODMA),
SR348L Ethoxylated 2 bisphenol A dimethacrylate (BPA2EODMA),
SR350D Trimethylolpropane trimethacrylate (TMPTMA),
SR480 Ethoxylated 10 bisphenol A dimethacrylate (BPA10EODMA),
SR540 Ethoxylated 4 bisphenol A dimethacrylate (BPA4EODMA),
SR596 Alkoxylated pentaerythritol tetramethacrylate (PETTMA),
SR604 Polypropylene glycol monomethacrylate (PPGMA),
SR834 Tricyclodecanedimethanol dimethacrylate (TCD-DMDMA), and
SR9054 Acidic difunctional adhesion promoter;
Sartomer-manufactured acrylate-type coagents, such as:
SR238 1,6-hexanediol diacrylate (HDDA),
SR259 Polyethylene glycol (200) diacrylate (PEG200DA),
SR268G Tetraethylene glycol diacrylate (TTEGDA),
SR272 Triethylene glycol diacrylate (TIEGDA),
SR295 Pentaerythritol tetraacrylate (PETTA),
SR306 Tripropylene glycol diacrylate (TPGDA),
SR307 Polybutadiene diacrylate (PBDDA),
SR341 3-methyl 1,5-pentanediol diacrylate (MPDA),
SR344 Polyethylene glycol (400) diacrylate (PEG400DA),
SR345 High performance high functional monomer,
SR349 Ethoxylated 3 bisphenol A diacrylate (BPA3EODA),
SR351 Trimethylolpropane triacrylate (TMPTA),
SR355 Di-trimethylolpropane tetraacrylate (Di TMPTTA),
SR368 Tris (2-hydroxyethyl) isocyanurate triacrylate (THEICTA),
SR399 Dipentaerythritol pentaacrylate (Di PEPA),
SR415 Ethoxylated (20) trimethylolpropane triacrylate (TMP20EOTA),
SR444 Modified pentaerythritol triacrylate,
SR444D Pentaerythritol triacrylate (PETIA),
SR454 Ethoxylated 3 trimethylolpropane triacrylate (TMP3EOTA),
SR492 Propoxylated 3 trimethylolpropane triacrylate (TMP3POTA),
SR494 Ethoxylated 4 pentaerythritol tetraacrylate (PETTA),
SR499 Ethoxylated 6 trimethylolpropane triacrylate (TMP6EOTA),
SR502 Ethoxylated 9 trimethylolpropane triacrylate (TMP9EOTA),
SR508 Dipropylene glycol diacrylate (DPGDA),
SR534D Multifunctional acrylate specific for sulfur cure,
SR595 1,10 decanediol diacrylate (DDDA),
SR601E Ethoxylated 4 bisphenol A diacrylate (BPA4EODA),
SR602 Ethoxylated 10 bisphenol A diacrylate (BPA10EODA),
SR606A Esterdiol diacrylate (EDDA),
SR610 Polyethylene glycol 600 diacrylate (PEG600DA),
SR802 Alkoxylated diacrylate,
SR833S Tricyclodecanedimethanol diacrylate (TCD-DMDA),
SR9003 Propoxylated 2 neopentyl glycol diacrylate (PONPGDA),
SR9020 Propoxylated 3 glyceryl triacrylate (GPTA),
SR9035 Ethoxylated 15 trimethylolpropane triacrylate (TMP15EOTA), and
SR9046 Ethoxylated 12 glyceryl triacrylate (G12EOTA);
Sartomer-manufactured Special Scorch Protected Type Coagents, such as:
Saret® 297F Liquid Scorch protected methacrylate,
Saret® 350S Liquid Scorch protected methacrylate,
Saret® 350W Liquid Scorch protected methacrylate,
Saret® 500 Liquid Scorch protected methacrylate,
Saret® 517 Liquid Scorch protected methacrylate, and
Saret® 521 Liquid Scorch protected methacrylate;
Cray Valley liquid high vinyl polybutadiene;
liquid polybutadienes;
Poly Bd® and Krasol® series of hydroxyl terminated liquid polybutadienes;
Ricon Resins; e.g., Ricon® 154; Ricon® 156 MA17;
Functionalized liquid polybutadiene coagents such as:
diallyl functionalized polybutadienes,
dimethacrylate functionalized polybutadienes,
diacrylate functionalized polybutadienes
Allylic-type coagents, such as:
Triallyl cyanurate (TAC),
Triallyl isocyanurate (TAIC),
Triallylphosphate (TAP), Triallyl borate (TAB),
trimethallyl isocyanurate (TMAIC),
Diallylterephthalate (DATP) aka diallyl phthalate,
Diallyl carbonate,
Diallyl maleate,
Diallyl fumarate,
Diallyl phosphite,
Trimethylolpropane diallyl ether,
Poly(diallyl isophthalate), and
Glyoxal bis(diallyl acetal) (1,1,2,2-Tetraallyloxyethane);
Hybrid-type coagents, such as:
Allyl methacrylate,
Allyl acrylate,
Allyl methacrylate oligomer,
Allyl acrylate oligomer, and
Sartomer SR523: New Dual Functional Coagent (an allyl methacrylate or acrylate derivative);
2,4-Diphenyl-4-methyl-1-pentene, also known as Nofmer MSD (alpha-methylstyrene dimer) (available from Nofco, particularly for wire and cable applications); and
miscellaneous other crosslinking coagents, such as:
N,N'-m-phenylenedimaleimide, also known as HVA-2 (available from DuPont),
N,N'-p-phenylenedimaleimide,
Cis-1,2-polybutadiene (1,2-BR),
Divinylbenzene (DVB), and
4,4'-(bismaleimide) diphenyl disulphide.

Preferred coagents include one or more of the following: 2,4-diphenyl-4-methyl-1-pentene also known as Nofmer® MSD; divinyl benzene; triallyl cyanurate; triallyl isocyanurate; trimethallyl isocyanurate; triallylphosphate; Sartomer's CN 9101 and CN 9102 tetra allyl urethane oligomers; diallyl maleate; diallyl fumarate; tetraallyl pentaerythritol; pentaerythritol triallyl ether; trimethylolpropane trimethacrylate; trimethylolpropane triacrylate; allyl methacrylate oligomer; 1,4-butanediol dimethacrylate; N,N'-m-phenylenedimaleimide; Sartomer SR-523 trimethylolpropane diallyl methacrylate; zinc diacrylate; zinc dimethacrylate; Saret® 297F; Saret® 350S; Saret® 350W; Saret® 500; Saret® 515; Saret® 516HP; Saret® 517HP; Saret® 519HP; Saret® 521HP; Saret® 522; liquid high vinyl polybutadiene; liquid polybutadiene; Poly Bd® and Krasol® series of hydroxyl terminated liquid polybutadienes; Ricon® Resins; e.g., Ricon® 154; and Ricon® 156 MA17.

Non-limiting examples of optional inert fillers for use in the organic peroxide formulations of the present invention include water washed clay, e.g., Burgess Clay, precipitated silica, precipitated calcium carbonate, synthetic calcium silicate, and combinations thereof. Various combinations of these fillers can be used by one skilled in the art to achieve a free-flowing, non-caking final peroxide formulation.

In accordance with particular embodiments, the organic peroxide formulations of the present invention may include a silica filler.

The organic peroxide formulations of the present invention may optionally include at least one additive selected from the group consisting of process oils (e.g., aliphatic process oils), process aids, pigments, dyes, tackifiers, waxes, reinforcing aids, UV stabilization agents, blowing agents, activators, antiozonants and coagents (e.g., those marketed by Sartomer).

According to particular embodiments, the organic peroxide formulation comprises, consists essentially of, or consists of:
between about 92 wt % and about 98 wt % organic peroxide(s),
between about 1 wt % and about 7 wt % nitroxide(s), and
between about 1 wt % and about 7 wt % quinone(s) (with the combined total of nitroxide(s) and quinone(s) being between about 2 wt % and about 8 wt %).

An additional embodiment of the present invention provides an elastomer composition comprising, consisting essentially of, or consisting of:
at least one elastomer,
at least one organic peroxide,
at least one nitroxide-containing compound (e.g., 4-hydroxy-TEMPO (4-OHT)), and
at least one quinone-containing compound (e.g., mono-tert-butylhydroquinone (MTBHQ)).

In at least one embodiment, the elastomer compositions of the present invention may comprise a saturated elastomer, an unsaturated elastomer, or a blend of both a saturated and unsaturated elastomer.

According to particular embodiments, the elastomer compositions of the present invention further comprise at least one polymer. The at least one polymer of the elastomer composition may comprise a saturated polymer, an unsaturated polymer, or both a saturated and unsaturated polymer.

It should be noted that commercially-available pre-compounded elastomers may be used in accordance with the present invention. These elastomers may contain additives such as carbon black filler, process oils, mold release agents, antioxidants and/or heat stabilizers. According to particular embodiments, the at least one elastomer is part of an elastomer masterbatch that includes one or more of these additives. For example, an elastomer masterbatch may comprise, consist essentially of, or consist of the at least one elastomer and one or more additives selected from the group consisting of carbon black, polyethylene glycol, at least one process oil (e.g., liquid saturated hydrocarbons, such as Primol® 352), at least one antioxidant (e.g., 2,2,4-trimethyl-1,2-dihydroquinoline, also referred to as TMQ), at least one mold release agent, at least one heat stabilizer, and a combination thereof.

As used herein, the term "polymer" means a non-elastomeric polymer comprised of at least at least one monomer in polymerized form. The term "polymer" encompasses homopolymers and copolymers, where the term "copolymers" refers to a polymer comprised of at least two different monomers in polymerized form. For example, a copolymer in accordance with the present disclosure may be a polymer comprising two different monomers, a terpolymer is a polymer comprising three different monomers or more.

In at least one embodiment, the polymer of the elastomer composition comprises a copolymer. The embodiments disclosed herein recite elastomer compositions comprising a copolymer. However, as one of ordinary skill in the art would readily appreciate, a homopolymer may be substituted in any embodiment comprising a copolymer, unless expressly indicated to the contrary.

In at least one embodiment, the elastomer composition comprises at least one elastomer and at least one copolymer. The elastomer and copolymer may be present in the elastomer composition at weight ratios ranging from 99:1 to 1:99, such as, for example, from 85:15 to 15:85, or from 75:25 to 25:75. In at least one embodiment, the elastomer and copolymer are present in the elastomer composition in a 50:50 weight ratio. In another embodiment, the elastomer composition includes 100% elastomer(s) and no copolymer(s).

According to at least one embodiment, the elastomer composition comprises at least one saturated elastomer. The saturated elastomer can be selected from, for example, silicon rubber without unsaturation (Q), methyl-polysiloxane (MQ), phenyl-methyl-polysiloxane (PMQ), ethylene-vinyl acetate (EVA), high-density polyethylene (HDPE), low-density polyethylene (LDPE), chlorinated poly(ethylene) (CPE), poly(ethylene propylene) (EPM), fluoroelastomers (FKM, FFKM) (e.g., Viton® and Dyneon®), and combinations thereof.

According to at least one embodiment, the elastomer composition comprises at least one unsaturated elastomer. Unsaturated elastomers that may be used in the elastomer composition include, for example, ethylene-propylene-diene terpolymer (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber (BIIR), chlorobutyl rubber, and combinations thereof.

In accordance with at least one embodiment, the elastomer composition comprises at least one saturated copolymer. Non-limiting examples of saturated polymers that may be used include copolymers of ethylene with propylene, butylene, pentene, hexane, heptane, octane, and vinyl acetate, such as, linear low density polyethylene (LLDPE), low density polyethylene (LDPE), poly(ethylene vinyl acetate) (EVA), poly(ethylene propylene) (EPM), poly(ethylene octene) (e.g., Engage®), poly(ethylene hexene), poly(ethylene butylene) (e.g., Tafmer®), Vamac® polymers (e.g., poly(ethylene methyl acrylate), poly(ethylene acrylate), and combinations with acrylic acid), and combinations thereof.

Another embodiment of the present invention relates to a method for manufacturing an article comprising an elastomer composition as described herein, wherein the method comprises curing the elastomer composition.

As used herein, the term "curing" refers to the crosslinking of a polymer to form a strengthened or hardened polymer. A curing step may be performed in any conventional manner.

The method may comprise extruding an elastomer composition, as described herein, to form an uncured preform article, and curing the uncured preform article.

At least one embodiment of the present invention relates to a process for curing an elastomer composition, wherein the composition comprises, consists essentially of, or consists of:
at least one elastomer,
at least one organic peroxide,
at least one nitroxide-containing compound (e.g., 4-hydroxy-TEMPO (4-OHT)), and
at least one quinone-containing compound (e.g., mono-tert-butylhydroquinone (MTBHQ)). The process may further comprise mixing the components separately or together, and in any order, to provide the elastomer composition.

In at least one embodiment, one or more conventional additives such as antioxidants (e.g., hindered phenols and polymeric quinoline derivatives), aliphatic process oils, process aids, pigments, dyes, tackifiers, waxes, reinforcing aids, UV stabilization agents, blowing agents, scorch protectors, activators, antiozonants or coagents may also be added to any of the elastomer compositions described herein before, after and/or during the curing step.

Non-limiting examples of applications for the peroxide formulations of the present invention include the use of liquid and filler-extended grades of the organic peroxides for crosslinked HDPE rotational molding; PEX-a pipe production; injection molded, compression molded, transfer molded crosslinked goods; wire and cable; general crosslinked elastomers, rubber and polymers; modification of polymer molecular weight and grafting of agents such as maleic anhydride (MAH) and glycidyl methacrylate; dynamic vulcanization for production of TPV (thermoplastic vulcanizates); and crosslinked rubber or polymer foams.

The embodiments described herein are intended to be exemplary of the invention and not limitations thereof. One skilled in the art will appreciate that modifications to the embodiments and examples of the present disclosure may be made without departing the scope of the present disclosure. The embodiments of the invention are described above using the term "comprising" and variations thereof. However, it is the intent of the inventors that the term "comprising" may be substituted in any of the embodiments described herein with "consisting of" and "consisting essentially of" without departing the scope of the invention.

The invention further includes the following embodiments

1. An organic peroxide formulation comprising:
   at least one organic peroxide,
   at least one nitroxide-containing compound, and
   at least one quinone-containing compound.
2. The organic peroxide formulation of claim 1, wherein the at least one nitroxide-containing compound comprises 4-OHT.
3. The organic peroxide formulation of any of claim 1, wherein the at least one nitroxide-containing compound is at least one or more of the following: 4-hydroxy TEMPO (4-OHT) and TEMPO (2,2,6,6-tetramethylpiperidine 1-oxyl).
4. The organic peroxide formulation of any of claims 1 to 3, wherein the at least one quinone-containing compound comprises MTBHQ.
5. The organic peroxide formulation of any of claims 1 to 4, wherein the at least quinone-containing compound comprises HQMME.
6. The organic peroxide formulation of any of claims 1 to 3, wherein the at least one quinone-containing compound is at least one or more of the following: mono-tert-butylhydroquinone (MTBHQ); hydroquinone; hydroquinone mono-methyl ether (HQMME); mono-t-amylhydroquinone and di-t-amyl hydroquinone.
7. The organic peroxide formulation of any of claims 1 to 6, further comprising at least one crosslinking coagent comprising a moiety having at least two functional groups, wherein said functional groups are selected from the groups consisting of allylic, methacrylic, acrylic and may be the same or different.
8. The organic peroxide formulation of any of claims 1 to 7, wherein the at least one peroxide comprises one or more of a dialkyl, peroxyketal, peroxyester, monoperoxycarbonate or hydroperoxide type peroxide.
9. A method for manufacturing the organic peroxide formulation of claim 1 comprising mixing the at least one organic peroxide, the at least one nitroxide-containing compound, and the at least one quinone-containing compound.
10. An elastomer composition of any of claims 1 to 9 comprising:
    at least one elastomer,
    at least one organic peroxide,
    at least one nitroxide-containing compound, and
    at least one quinone-containing compound.

11. A process for curing an elastomer composition of any of claims 1 to 10, said process comprising:
   curing an elastomer composition in the presence of oxygen,
   wherein the elastomer composition comprises at least one elastomer, at least one organic peroxide, at least one nitroxide-containing compound, and at least one quinone-containing compound.
12. An elastomeric article manufactured according to the method of claim 11.
13. An organic peroxide formulation comprising:
   at least one organic peroxide,
   at least one nitroxide-containing compound, and
   at least one quinone-containing compound.
   at least one crosslinking coagent
14. The organic peroxide formulation of claim 13, wherein the at least one crosslinking coagent comprises a moiety having at least two functional groups, wherein said functional groups are selected from the groups consisting of allylic, methacrylic, acrylic and may be the same or different.
15. The organic peroxide formulation of claim 13, wherein the at least one crosslinking coagent comprises 2,4-diphenyl-4-methyl-1-pentene and optionally one of the coagents recited in claim 14.
16. The organic peroxide formulation of any of claims 13 to 15, wherein the at least one peroxide is more or more peroxide selected from the group consisting of dialkyl, peroxyketal, peroxyester, monoperoxycarbonate or hydroperoxide type peroxide.

Within this specification embodiments have bee described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The following examples further illustrate the best mode contemplated by the inventors for the practice of their invention and are to be construed as illustrative and not in limitation thereof.

EXAMPLES

Abbreviations Used in the Examples

MH (dN-m)=Maximum torque achieved in deci-Newton-meters; relates to crosslinking attained.
ML (dN-m)=Minimum torque in dN-m.
Ts0.4 (min)=Time in minutes to achieve a 0.4 dN-m increase from minimum torque.
Ts1.0 (min)=Time in minutes to achieve a 1.0 dN-m increase from minimum torque.
Ts2.0 (min)=Time in minutes to achieve a 2.0 dN-m increase from minimum torque
Tc90 (min)=Time in minutes to achieve 90% of the total cure time.
Luperox® F=m/p-di(t-butylperoxy)diisopropylbenzene (a meltable solid peroxide).
Luperox® IP-D16=t-butylperoxy-isopropenylcumylperoxide (a liquid peroxide).
Luperox® D-16=t-butyl cumylperoxide (a liquid peroxide).
Luperox® TBEC=OO-t-butylperoxy-O-(2-ethylhexyl) uonoperoxycarbonate.
4-OHT=4-Hydroxy TEMPO also known as 4-hydroxy-2,2,6,6-tetramethylpiperidin-1-oxyl.
HDPE=high density polyethylene
HQMME=hydroquinone mono-methyl ether; also known as 4-methoxy phenol (MEHQ)
MTBHQ=mono-tertiary-butyl-hydroquinone, CAS 1948-33-0.
TAC=triallyl cyanurate (a crosslinking coagent).
EVA=poly(ethylene vinylacetate).

Example 1

Crosslinking a polyethylene polymer, in this case HDPE (High Density Polyethylene), resulted in longer scorch times when using the synergistic combination of 4-OHT and MTBHQ. This blend, shown in TABLE 1 as OP-B, used less overall additive in the peroxide formulation, while providing significantly longer scorch time values for cure and compounding temperatures.

Efficiency=$[(MH-ML) \times Ts] \div (Tc90 - Ts)$, wherein a higher Efficiency value indicates a higher efficiency of scorch time with respect to the various additives' effect on the amount of crosslinking obtained and the cure time achieved for the peroxide formulation.

The synergy of 4-OHT and MTBHQ makes it possible to produce homogeneous liquid and meltable solid peroxide compositions for applications and processes that cannot normally tolerate fillers.

TABLE 1

| | Peroxide Formulations | | | | | |
|---|---|---|---|---|---|---|
| | OP-A | OP-B | OP-C | OP-D | OP-E | OP-F |
| | Organic Peroxide Formulations | | | | | |
| Luperox® IP-D16 | 0.0% | 0.0% | 48.7% | 48.4% | 46.0% | 46.7% |
| Luperox® F | 92.0% | 93.4% | 48.7% | 48.4% | 46.0% | 46.7% |
| 4-OHT | 8.0% | 4.0% | 0.0% | 0.0% | 8.0% | 4.0% |
| MTBHQ | 0.0% | 2.6% | 2.6% | 3.2% | 0.0% | 2.6% |
| Total | 100.0% | 100.0% | 100.0% | 100.0% | 100.0% | 100.0% |
| | Crosslinking HDPE | | | | | |
| HDPE parts | 100 | 100 | 100 | 100 | 100 | 100 |
| OP-A parts | 1.1 | — | — | — | — | — |
| OP-B parts | — | 1.1 | — | — | — | — |
| OP-C parts | — | — | 1.1 | — | — | — |
| OP-D parts | — | — | — | 1.1 | — | — |
| OP-E parts | — | — | — | — | 1.1 | — |
| OP-F parts | — | — | — | — | — | 1.1 |
| RPA Rheometer Cure Data @ 190° C., 1 deg arc, 100 cpm for HDPE | | | | | | |
| MH − ML (dN-m) | 10.2 | 10.1 | 10.14 | 10.17 | 10.13 | 10.2 |
| Ts0.4 (min) | 0.84 | 0.90 | 0.88 | 0.83 | 0.90 | 0.95 |
| Tc90 (min) | 3.30 | 3.35 | 3.5 | 3.63 | 3.42 | 3.53 |
| Efficiency | 3.48 | 3.71 | 3.53 | 3.01 | 3.62 | 3.76 |
| RPA Rheometer Compounding Data @ 162° C., 1 deg arc, 100 cpm for HDPE | | | | | | |
| Ts0.4 (min) | 6.80 | 7.5 | 6.7 | 6.32 | 8.17 | 8.33 |
| Ts1.0 (min) | 8.42 | 9.87 | 9.85 | 9.48 | 10.96 | 11.80 |

TABLE 1 compares the singular use of 8.0% 4-OHT in OP-A to the OP-B peroxide blend of the present invention, which comprises a blend of 4.0% 4-OHT and 2.6% MTBHQ. This blend of additives required only 6.6% versus 8.0% of 4-OHT in OP-A, while producing a considerably desirable longer scorch time protection (Ts0.4 and Ts1.0) when crosslinking the HDPE polymer at 190° C. and also at the 162° C. compounding temperature.

TABLE 1 also shows organic peroxide formulations OP—C, OP-D, OP-E and OP-F, which all use a 50:50 blend of two different peroxides, IP-D16 and Luperox® F. The IP-D16 is a higher half-life peroxide compared to Luperox® F, so it is slower in its rate of decomposition at a given temperature and will improve scorch time and increase cure time.

Using 2.6% MTBHQ in combination with 4% 4-OHT for a total of 6.6% additives in formulation OP-F provided significantly longer (Ts0.4 and Ts1.0) scorch times at 190° C. and 162° C. compared to the singular use of additives at equal to higher loadings, as shown for OP—C, OP-D and OP-E in TABLE 1.

Example 2

As shown in TABLE 2, the blend of 4-OHT and MTBHQ was compared to the singular use of 4-OHT along with a crosslinking coagent TAC (triallyl cyanurate). The blend in accordance with the invention, OP-H, provided a higher Efficiency calculation with respect to increased scorch time when crosslinking HDPE. The total weight of the synergistic blend was only 6.7% versus 8% for the single additive usage.

TABLE 2

| Peroxide Formulations | OP-G | OP-H |
|---|---|---|
| Organic Peroxide Formulations | | |
| Luperox ® F | 36.0% | 36.5% |
| TAC | 56.0% | 56.8% |
| 4-OHT | 8.0% | 4.1% |
| MTBHQ | 0.0% | 2.6% |
| Total | 100.0% | 100.0% |
| Crosslinking HDPE | | |
| HDPE parts | 100 | 100 |
| OP-F parts | 1.1 | — |
| OP-G parts | — | 1.1 |
| RPA Rheometer Cure Data @ 190° C., 1 deg arc, 100 cpm for HDPE | | |
| MH − ML (dN-m) | 10.24 | 10.25 |
| Ts0.4 (min) | 0.82 | 0.86 |
| Tc90 (min) | 2.89 | 3.00 |
| Efficiency | 4.05 | 4.12 |

Example 3

As shown in TABLE 3, the components of the organic peroxide formulations were compared on an equal weight basis for the crosslinking of EVA at 170° C. using the organic peroxide Luperox® D-16 (a liquid organic peroxide whose chemical name is t-butylcumylperoxide). The blend in accordance with the present invention in TABLE 3, OP-J, provided the best combination of crosslinking based on MH−ML (dN-m), plus the longest Ts1 and Ts2 (min) scorch times. The Tc90 time also increased, but based on the Efficiency calculations the increase in scorch time and good crosslinking performance more than made up for the increase in cure time. Good Efficiencies were obtained for the synergistic blend for both Ts1 and Ts2 values, surpassing the performance obtained by the equal weight usage of 4-OHT and MTBHQ in OP-I and OP-K respectively. The OP-K provided the highest scorch time values, but the MH−ML (dN-m) values were severely lowered, which significantly lowered the scorch Efficiency value, as shown in TABLE 3. Higher calculated scorch time Efficiency values are preferred.

TABLE 3

| | Parts of EVA | | |
|---|---|---|---|
| Peroxide Formulations | 100 OP-I | 100 OP-J | 100 OP-K |
| Crosslinking EVA | | | |
| Parts of Luperox ® D16 | 1.5 | 1.5 | 1.5 |
| Parts of 4-OHT | 0.4 | 0.2 | 0.0 |
| Parts of MTBHQ | 0.0 | 0.2 | 0.4 |
| RPA Rheometer Cure Data @ 170° C., 1 deg arc, 100 cpm for EVA | | | |
| MH − ML (dN-m) | 10.56 | 11.15 | 7.47 |
| Ts1 (min) | 1.16 | 1.66 | 2.08 |
| Ts2 (min) | 1.32 | 1.95 | 2.71 |
| Tc90 (min) | 5.11 | 6.63 | 8.09 |
| Efficiency based on Ts1 | 3.10 | 3.72 | 2.59 |
| Efficiency based on Ts2 | 3.68 | 4.65 | 3.76 |

Example 4

In Example 4 the synergistic benefit of using a blend of HQMME and 4-OHT in Run #3 is demonstrated; TABLE 4 for crosslinking EVA with a monoperoxycarbonate, e.g., OO-t-butylperoxy-O-(2-ethylhexyl)monoperoxycarbonate. The peroxide is a monoperoxycarbonate. The trade-name of OO-t-butylperoxy-O-(2-ethylhexyl)monoperoxycarbonate is Luperox® TBEC.

The combination of HQMME and 4-OHT provided a good crosslinking, increased Ts1 and Ts2 scorch time and provide an unexpectedly shorter cure time (based on Tc90 min), compared to Run #1 and #2 which use either HQMME or 4-OHT, but not in combination.

TABLE 4

| Run # | 1 | 2 | 3 |
|---|---|---|---|
| EVA | 100.000 | 100.000 | 100.000 |
| Luperox ® TBEC | 0.608 | 0.686 | 0.686 |
| HQMME | 0.041 | — | 0.046 |
| TAC (triallyl cyanurate) | 0.162 | 0.183 | 0.183 |
| 4-OHT | — | 0.110 | 0.259 |
| Crosslinking EVA: RPA cure at 160 C., 0.5 deg arc, 100 cpm | | | |
| MH (dN-m) | 29.49 | 27.864 | 22.234 |
| ML (dN-m) | 12.089 | 11.647 | 11.685 |
| Ts1 (min) | 0.34 | 0.33 | 0.39 |
| Ts2 (min) | 0.45 | 0.44 | 0.56 |
| Tc90 (min) | 14.13 | 16.67 | 5.31 |
| Efficiency based on Ts1 (min) | 0.43 | 0.33 | 0.84 |
| Efficiency based on Ts2 (min) | 0.55 | 0.33 | 1.86 |

The unexpected synergy using 4-OHT and MTBHQ when blended with Luperox® TBEC makes it possible to provide an unexpected good crosslinking with longer Ts1 and Ts2 scorch times and a substantially shorter cure time (based on Tc90) thus improving overall productivity, as demonstrated by the Efficiency equation. TAC (triallyl cyanurate) a crosslinking coagent was also used in all of the peroxide formulations in Example 4.

$$\text{Efficiency} = [(MH - ML) \times Ts] \div (Tc90 - Ts) \quad \text{"Efficiency equation"}$$

A higher Efficiency value may indicate a higher efficiency of scorch time and cure time taking into account crosslinking. The equation helps to compare the benefits of the final peroxide formulation. A longer scorch time is desired, but not at the expense of a substantially longer cure time. If one can substantially decrease cure time, while maintaining or increasing scorch time, that is preferred. The novel blend of HQMME and 4-OHT provided improved overall crosslinking efficiency as demonstrated by the determination obtained from the "Efficiency equation".

What is claimed is:

1. A liquid or meltable solid organic peroxide formulation for curing solid elastomer compositions, said formulation comprising:
    between about 92-about 98 weight percent of at least one organic peroxide,
    between about 1-about 7 weight percent of at least one nitroxide-containing compound comprising at least one or more of the following; 4-hydroxy TEMPO (4-OHT) and TEMPO (2,2,6,6-tetramethylpiperidine 1-oxyl), and
    between about 1-about 7 weight percent of at least one quinone-containing compound comprising mono-tert-butylhydroquinone (MTBHQ); hydroquinone; hydroquinone mono-methyl ether (HQMME); mono-t-amyl-hydroquinone and di-t-amyl hydroquinone,
    wherein said organic peroxide formulation is capable of curing said solid elastomers.

2. The organic peroxide formulation of claim 1, wherein the at least one nitroxide-containing compound is 4-hydoxy TEMPO (4-OHT).

3. The organic peroxide formulation of claim 1, wherein the at least one nitroxide-containing compound is TEMPO (2,2,6,6-tetramethylpiperidine 1-oxyl).

4. The organic peroxide formulation of claim 1, wherein the at least one quinone-containing compound comprises MTBHQ.

5. The organic peroxide formulation of claim 1, wherein the at least quinone-containing compound comprises HQMME.

6. The organic peroxide formulation of claim 1 further comprising at least one crosslinking coagent comprising a moiety having at least two functional groups, wherein said functional groups are selected from the groups consisting of allylic, methacrylic, acrylic and may be the same or different.

7. The organic peroxide formulation of claim 1, wherein the at least one peroxide comprises one or more of a dialkyl, peroxyketal, peroxyester, monoperoxycarbonate or hydroperoxide type peroxide.

8. A method for manufacturing the organic peroxide formulation of claim 1 comprising mixing the at least one organic peroxide, the at least one nitroxide-containing compound, and the at least one quinone-containing compound.

9. An elastomer composition comprising:
    at least one solid elastomer, and the liquid or meltable solid organic peroxide formulation of claim 1.

10. A process for curing an elastomer composition in the presence of oxygen, said process comprising:
    curing an elastomer composition in the presence of oxygen,
    wherein the elastomer composition comprises at least one solid elastomer, and the liquid or meltable solid organic peroxide formulation of claim 1.

11. An elastomeric article manufactured according to the method of claim 10.

12. An A liquid or meltable solid organic peroxide formulation for curing solid elastomer compositions, said formulation comprising:
    at least one organic peroxide,
    at least one nitroxide-containing compound comprising at least 4-hydroxy TEMPO (4-OHT),
    at least one quinone-containing compound comprising mono-tert-butylhydroquinone (MTBHQ); hydroquinone; hydroquinone mono-methyl ether (HQMME); mono-t-amylhydroquinone and di-t-amyl hydroquinone, and
    at least one crosslinking coagent comprising a moiety having at least two functional groups, wherein said functional groups are selected from the groups consisting of allylic, methacrylic, acrylic and may be the same or different,
    where said organic peroxide formulation is capable of curing said solid elastomers.

13. The liquid or meltable solid organic peroxide formulation of claim 12, wherein the at least one peroxide is more or more peroxide selected from the group consisting of dialkyl, peroxyketal, peroxyester, monoperoxycarbonate or hydroperoxide peroxides.

14. The liquid or meltable solid organic peroxide formulation of claim 1, wherein the combined total of nitroxide and quinone is between about 2-about 8 weight percent.

15. The liquid or meltable solid organic peroxide formulation of claim 1, wherein said liquid or meltable solid organic peroxide formulation is sprayable.

16. The liquid or meltable solid organic peroxide formulation of claim 1, wherein said nitroxide-containing compound is 4-hydroxy TEMPO (4-OHT), and said quinone-containing compound is mono-tert-butylhydroquinone (MTBHQ), and/or hydroquinone mono-methyl ether (HQMME).

17. The liquid or meltable solid organic peroxide formulation of claim 12, wherein said liquid or meltable solid organic peroxide formulation is sprayable.

* * * * *

UNITED STATES PATENT AND TRADEMARK OFFICE
CERTIFICATE OF CORRECTION

PATENT NO. : 10,344,142 B2
APPLICATION NO. : 15/531740
DATED : July 9, 2019
INVENTOR(S) : Leonard H. Palys, William P. Pavlek and Peter R. Dluzneski It is certified that error appears in the above-identified patent and that said Letters Patent is hereby corrected as shown below:

In the Claims

Column 17, Line 16:
-- quinone-containing compound comprising mono-tert- --
Should read:
-- quinone-containing compound comprising at least one or more of the following: mono-tert- --

Column 18, Line 17:
-- at least one quinone-containing compound comprising --
Should read:
-- at least one quinone-containing compound comprising at least one or more of the following: --

Signed and Sealed this
First Day of November, 2022

Katherine Kelly Vidal
*Director of the United States Patent and Trademark Office*